(12) United States Patent
Thakur et al.

(10) Patent No.: US 12,175,490 B2
(45) Date of Patent: Dec. 24, 2024

(54) INTER-ENTITY NON-MONETARY TRANSACTIONS

(71) Applicant: NCR Atleos Corporation, Atlanta, GA (US)

(72) Inventors: Vishal Thakur, Hyderabad (IN); Akshay Miryalkar, Hyderabad (IN); Vaibhav Sah, Secunderabad (IN)

(73) Assignee: NCR Atleos Corporation, Atlanta, GA (US)

( * ) Notice: Subject to any disclaimer, the term of this patent is extended or adjusted under 35 U.S.C. 154(b) by 75 days.

(21) Appl. No.: 16/668,925

(22) Filed: Oct. 30, 2019

(65) Prior Publication Data

US 2021/0133794 A1    May 6, 2021

(51) Int. Cl.
| | |
|---|---|
| *G06Q 30/00* | (2023.01) |
| *G06F 16/23* | (2019.01) |
| *G06Q 20/20* | (2012.01) |
| *G06Q 20/32* | (2012.01) |
| *G06Q 20/38* | (2012.01) |
| *G06Q 30/0226* | (2023.01) |
| *G06Q 30/0238* | (2023.01) |

(52) U.S. Cl.
CPC ..... *G06Q 30/0229* (2013.01); *G06F 16/2365* (2019.01); *G06F 16/2379* (2019.01); *G06Q 20/202* (2013.01); *G06Q 20/3278* (2013.01); *G06Q 20/389* (2013.01); *G06Q 30/0238* (2013.01)

(58) Field of Classification Search
None
See application file for complete search history.

(56) References Cited

U.S. PATENT DOCUMENTS 9,870,562 B2 *   1/2018   Davis ................... G06Q 20/02
11,501,365 B1 *  11/2022  Awasthy ................. H04L 9/30
(Continued)

OTHER PUBLICATIONS

Ledger (Blockchain) Based Data Access and Distribution Control (Year: 2019).*
(Continued)

*Primary Examiner* — Christopher Stroud
(74) *Attorney, Agent, or Firm* — Schwegman Lundberg & Woessner, P.A.

(57) ABSTRACT

Various embodiments herein each include at least one of systems, methods, software, and data structures that facilitate inter-entity non-monetary transactions. Some such embodiments include a single account identifier per consumer that is utilized across multiple entities to identify a single award account which is credited and debited in the consumer's transactions with all participating entities. One method embodiment includes receiving a unique account identifier within a transaction involving an account of the unique account identifier and calculating a value based on the transaction for transfer to the account of the account identifier. The method then generates a data structure in memory to transfer the calculated value to the account of the account identifier and signing the data structure in the memory with a private key of a private/public key-pair. The method then transmits the data structure to a computing system storing a replicated trusted ledger used to maintain value balances.

9 Claims, 5 Drawing Sheets

(56) References Cited

U.S. PATENT DOCUMENTS

| | | | |
|---|---|---|---|
| 2011/0196732 A1* | 8/2011 | Schueller | G06Q 30/0233 705/14.33 |
| 2014/0172534 A1* | 6/2014 | Spears | G06Q 10/101 705/14.27 |
| 2016/0358186 A1* | 12/2016 | Radocchia | G06Q 30/018 |
| 2017/0345019 A1* | 11/2017 | Radocchia | G06K 19/07798 |
| 2018/0082294 A1* | 3/2018 | Davis | G06Q 20/3678 |
| 2019/0058593 A1* | 2/2019 | Polcha | H04L 9/3231 |
| 2019/0108543 A1* | 4/2019 | Chan | G06Q 30/0229 |
| 2019/0156363 A1* | 5/2019 | Postrel | H04L 67/566 |
| 2019/0180311 A1* | 6/2019 | Chan | G06Q 30/0236 |
| 2019/0370866 A1* | 12/2019 | Lawbaugh | G06Q 30/0254 |
| 2019/0385130 A1* | 12/2019 | Mossoba | G06Q 20/02 |
| 2020/0036707 A1* | 1/2020 | Callahan | H04L 67/53 |
| 2020/0089895 A1* | 3/2020 | Gollogly | G06F 21/602 |
| 2020/0134656 A1* | 4/2020 | Padmanabhan | H04L 9/0637 |
| 2020/0210413 A1* | 7/2020 | Quick | H04L 9/3297 |
| 2021/0125177 A1* | 4/2021 | West | G06Q 20/3827 |

OTHER PUBLICATIONS

"Blockchain: what is in a block?"—Damien Cosset—https://dev.to/damcosset/blockchain-what-is-in-a-block-48jo (Year: 2017).*

* cited by examiner

INTER-ENTITY NON-MONETARY TRANSACTIONS

BACKGROUND INFORMATION

Consumers typically conduct transactions with a plurality of retail, transportation, hospitality, and financial service entities. Many of these entities encourage loyalty by granting points, miles, or other non-monetary awards that are redeemable with the granting entity, and perhaps a few other partner entities. Regardless of the partner entities, consumers eventually have balances in accounts with several entities. Tracking each of these balances, the rules of each program, balance expiration dates, and redemption options eventually become quite complicated and time consuming. As a result, consumers most often focus on one or few of such programs. Consumer data is therefore lost and fewer benefits of the programs are realized by the entities and consumers receive less than the possible rewards for their patronage of entities operating such programs.

SUMMARY

Various embodiments herein each include at least one of systems, methods, software, and data structures that facilitate inter-entity non-monetary transactions. Some such embodiments include a single account identifier per consumer that is utilized across multiple entities to identify a single award account which is credited and debited in the consumer's transactions with all participating entities.

One embodiment, in the form of a method includes receiving, by a computing system of an entity, a unique account identifier within a transaction involving an account of the unique account identifier and calculating, on the computing system of the entity, a value based on the transaction for transfer to the account of the account identifier. The method also includes generating, on the computing system of the entity, a data structure in memory to transfer the calculated value to the account of the account identifier and signing the data structure in the memory with a private key of a private/public key-pair of the entity. The method further includes transmitting the data structure from the computing system of the entity to a computing system where a replicated trusted ledger used to maintain value balances is maintained.

Another method embodiment includes receiving a unique account identifier as part of data received at a point of sale (POS) device of an entity for a purchase transaction. The POS device then executes the transaction and upon successful completion thereof, the method then calculates a point value for awarding to an account of the unique account identifier based on at least one factor of the successfully executed transaction. Subsequently, the method proceeds by writing, over a network to a replicated trusted ledger, data including the unique account identifier and the calculated point value to award the calculated point value to the account of the unique account identifier. The replicated trusted ledger is used in such embodiments to maintain account point values of customers for a plurality of entities, the point values redeemable at each of the plurality of entities without regard to which entity credited any or all of the point values. This may include writing the data to replications of the replicated trusted ledger at multiple network locations where the veracity of the data is tested and objected to, forcing a rollback or rejection across all replications, of the written data.

A further embodiment is in the form of a POS device. The POS device includes a network interface device, a computer processor, and a memory storing instructions executable by the computer processor to perform data processing activities. The data processing activities may include receiving a unique account identifier as part of data received for a purchase transaction and executing the purchase transaction. Upon successful execution of the transaction, the data processing activities proceed by calculating a point value for awarding to an account of the unique account identifier based on at least one factor of the successfully executed transaction, such as a monetary value of the transaction, a fixed point value per transaction or per item included in the transaction, and the like. The data processing activities in some embodiments further include writing, via the network interface device over a network to a replicated trusted ledger, data including the unique account identifier and the calculated point value to award the calculated point value to the account of the unique account identifier. The replicated trusted ledger is used in such embodiments to maintain account point values of customers for a plurality of entities, the point values redeemable at each of the plurality of entities without regard to which entity credited any or all of the point values.

DETAILED DESCRIPTION

Figure 1:
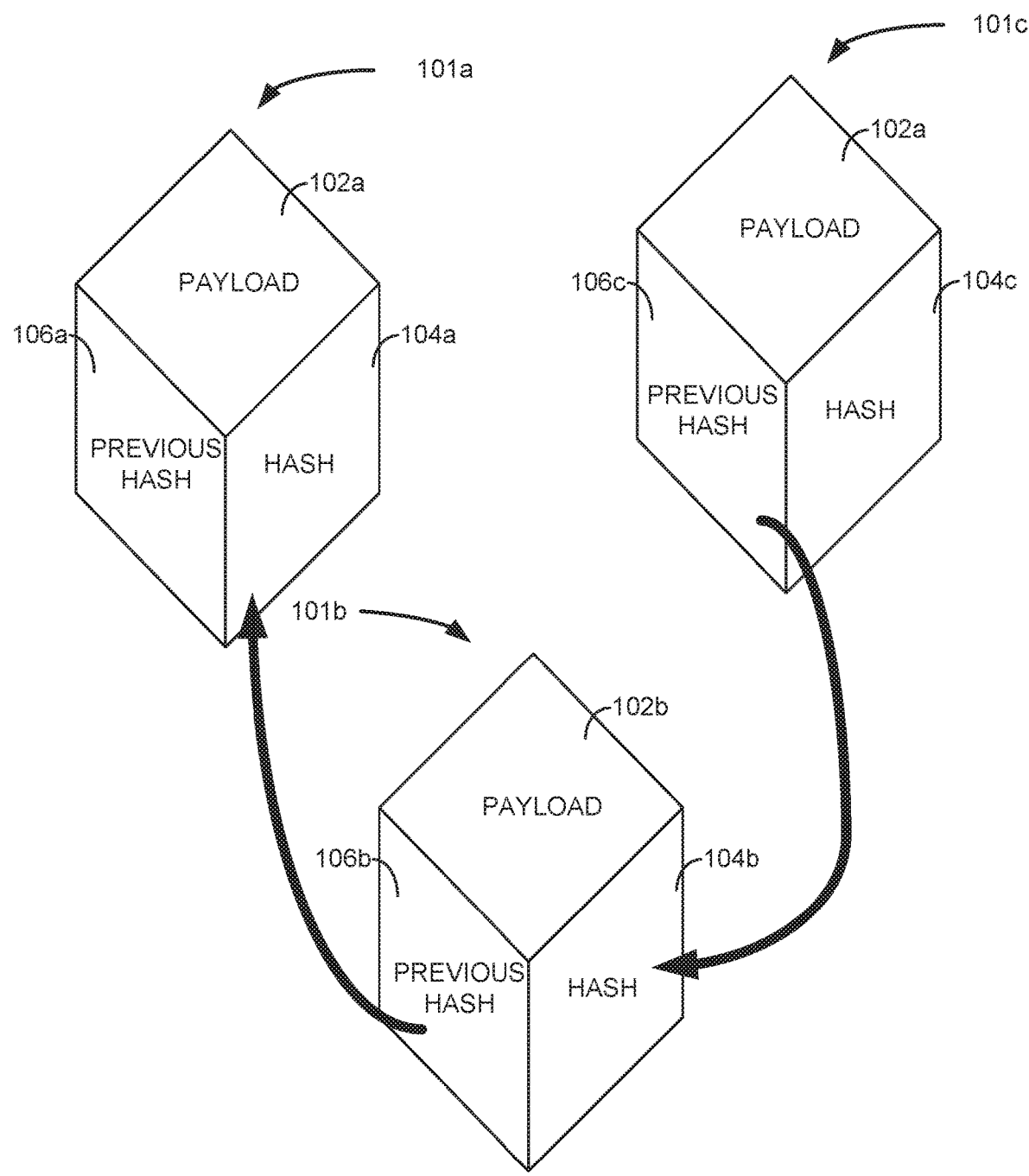
FIG. 1 is a logical diagram of data structures, according to an example embodiment.

Various embodiments herein each include at least one of systems, methods, software, and data structures that facilitate inter-entity non-monetary transactions. Some such embodiments include a single account identifier per consumer that is utilized across multiple entities to identify a single award account which is credited and debited in the consumer's transactions with all participating entities.

As mentioned above, consumers typically conduct transactions with a plurality of retail, transportation, hospitality, and financial service entities. Many of these entities encourage loyalty by granting points, miles, or other non-monetary awards that are redeemable with the granting entity, and perhaps a few other partner entities. Regardless of the partner entities, consumers eventually have balances in accounts with several entities. Tracking each of these balances, the rules of each program, balance expiration dates, and redemption options eventually become quite complicated and time consuming. As a result, consumers most often focus on one or few of such programs. Consumer data that can be used productively by merchants is therefore lost and fewer benefits of the programs are realized by the entities and consumers.

The various embodiments herein provide solutions to these challenges through a single, unified consumer account identifier. The account identifier is a unique identifier of a consumer and corresponds to an account, or account like dataset, that holds value added thereto by merchants. The account may be a digital wallet and the account identifier may be a digital identifier (DID) of a blockchain enabled solution. The points of such embodiments may be awarded by merchants based on various transaction elements, such as an amount paid, nights stayed, entrees ordered, a set value per transaction, coupon or bonus related amounts, and the like. Regardless of the amount of points awarded, when awarded, the amount of the award and the account identifier are written to a ledger, which may be centralized or replicated across many nodes, to credit the consumer account. The points may later be redeemed and the redeeming merchant may make a negative entry with regard to the account identifier in the ledger.

In such embodiments, merchants may have their own DID and point balances associated therewith. A central entity may be included in some embodiments to maintain the network of entities and to allocate and credit and debit underlying monetary value of points awarded and redeemed within the system. The central entity may be a developer, vendor, or servicer of payment transactions between consumers and merchants. Thus, in some embodiments, the points may not be granted or awarded by the merchants but instead be granted and redeemed by the central entity.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical diagram of data structures 101a, 101b, 101c, according to an example embodiment. The data structures 101a, 101b, 101c are examples of data structures that hold data written to a ledger awarding and debiting points from an account associated with an account identifier as discussed above. In some embodiments, the data structures 101a, 101b, 101c are blocks in a blockchain.

One or more of the data structures 101a, 101b, 101c may be generated when a transaction is successfully processed and points are to be awarded to an account. Similarly, one or more of the data structures may be generated to debit points from an account when the points are redeemed.

The data structures 101a, 101b, 101c are built on a blockchain platform. Thus, generally speaking, the data structures 101a, 101b, 101c each include point granting or redemption data as a data payload 102a, 102b, 102c. The data structures also include a hash value 104a, 104b, 104c that is generated from the data of the data payload 102a, 102b, 102c of the receptive data structure. The data structures 101a, 101b, 101c also include a pointer to a previous data structure, such as data structure 101c pointer 106c pointing to the hash 104b of prior data structure 101b. A sequence of the data structures 101a, 101b, 101c adds to the verifiable trust of the solution as it aids in abilities to detect tampering. Further, each data structure 101a, 101b, 101c includes a representation in a ledger that may be stored and updated in one or more locations. The ledger in such embodiments includes hash values and sequencing data that may be utilized to verify data of the data structures 101a, 101b, 101c.

In some embodiments, before a data structure 101a, 101b, 101c can be added to the ledger, the hash value may be confirmed as authentic by using a public key included in the data payload, retrievable based on data of the data payload, or otherwise known. Similarly, the previous hash data, when present, may be considered to validate the data.

The data in included in the data payload 102a, 102b, 102c includes at least a point value, positive or negative and an account identifier. The data payload 102a, 102b, 102c may also include one or more of an account identifier or an entity granting the points (i.e., a positive point value) or where the points were redeemed (i.e., negative point value), transaction related data such as a location and data and time of the transaction, an identifier of a point of sale terminal where the transaction was conducted, an entity transaction identifier, and other transaction related data.

Figure 2:
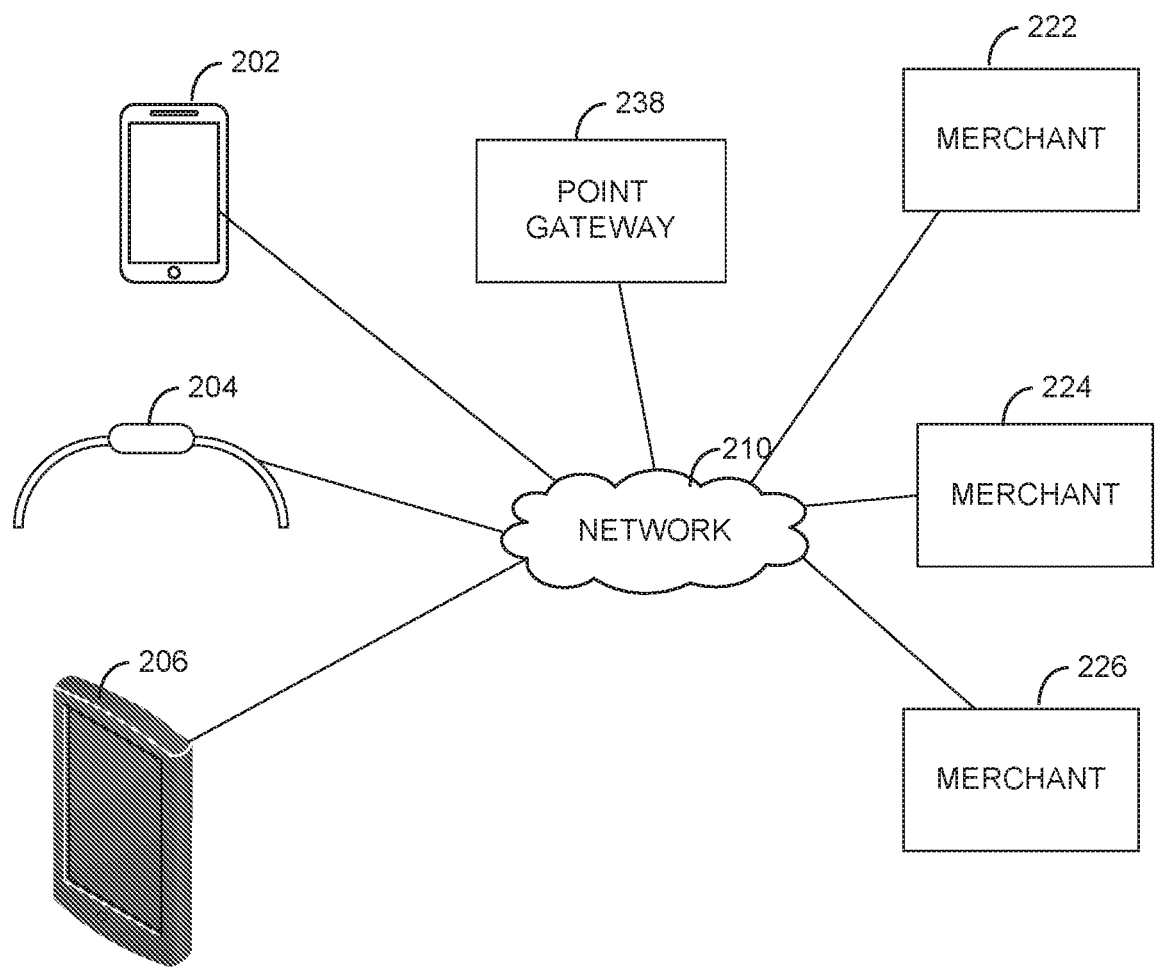
FIG. 2 is a network entity diagram, according to an example embodiment.

FIG. 2 is a network entity diagram, according to an example embodiment. The network entity diagram includes a point gateway 238 data processing entity that operates to facilitate inter-entity non-monetary transactions. The entities as illustrated include merchants 222, 224, 226. While only three entities are illustrated, other embodiments may include many more entities and they may be more than just merchants. For example, the entities may be hotels, banks and other financial entities, car rental companies, retailers, fuel stations, convenience stores, among others.

The point gateway 238 operates in some embodiments to perform accounting and reconciliation functions between participating entities, such as merchants 222, 224, 226. For example, in some embodiment, when merchant 222 adds more points to the network than are redeemed with the merchant 222, merchant 222 is obtaining more value from the point system than it is contributing.

The point gateway 238, the merchants 222, 224, 226, and customer devices 202, 204, 206 are interconnected via a network 210. The network 210 may include the Internet, wired and wireless networks, mobile operator network, and other network types that enable the various network entities to communicate data.

Figure 3:
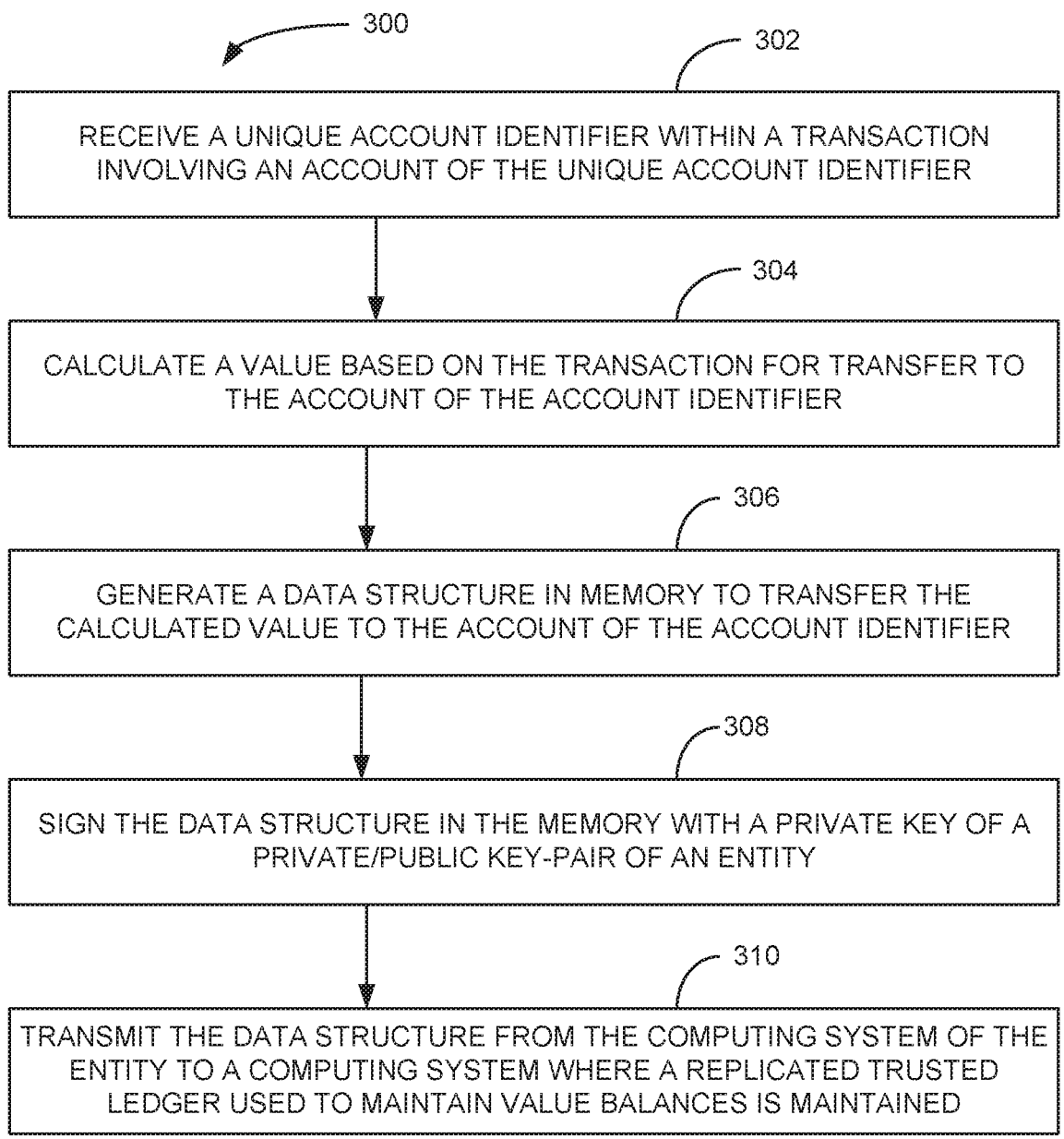
FIG. 3 is a block diagram of a method, according to an example embodiment.
Figure 4:
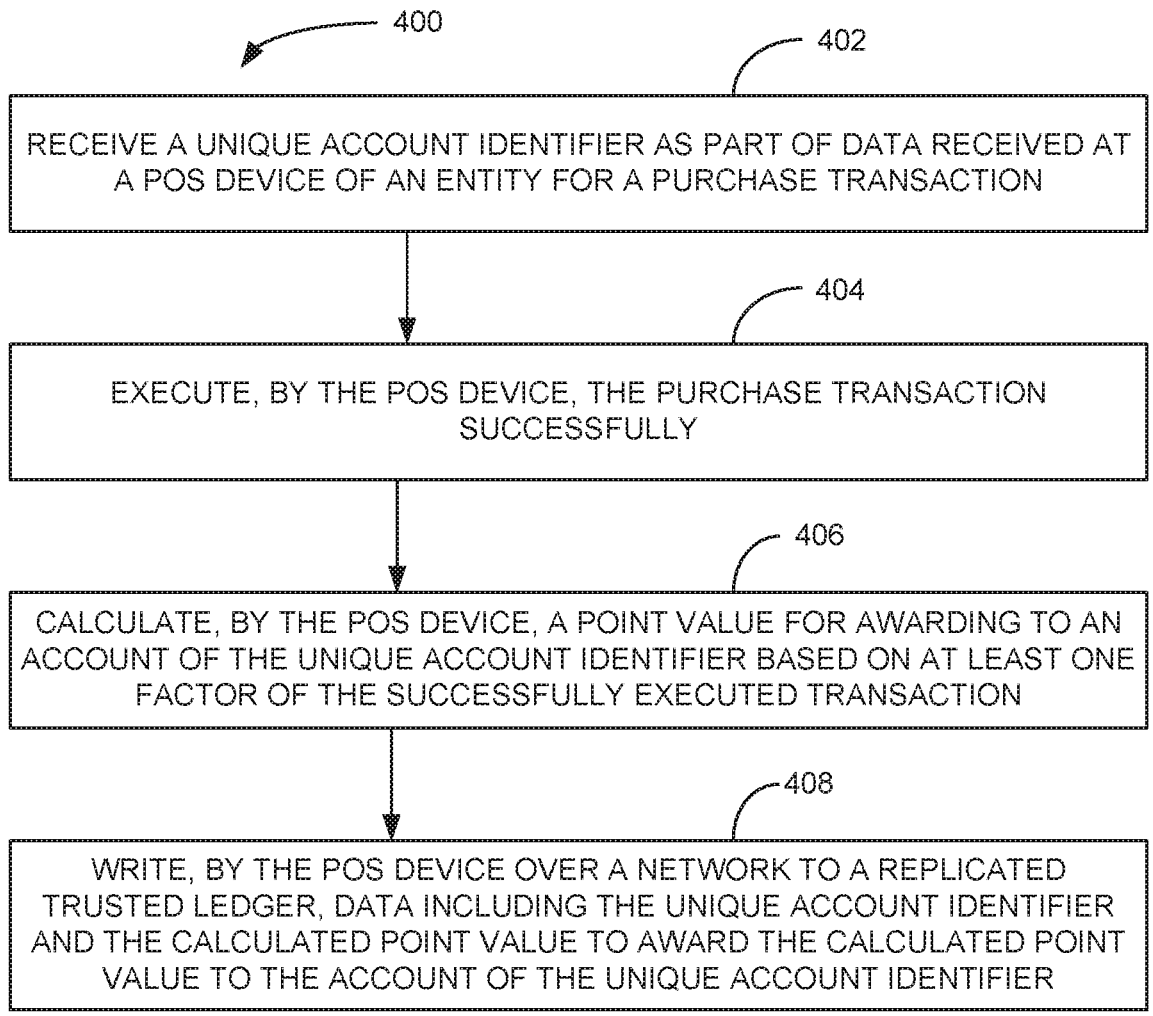
FIG. 4 is a block diagram of a method, according to an example embodiment.

The customer devices 202, 204, 206 may include any number of various device types, such as mobile devices, smartwatches, tablets, personal computers, fitness trackers, smart automobile and smart television controllers, among others. The customer devices 202, 204, 206 may include a mobile wallet application with an associated digital identifier (DID). The DID is the unique account identifier of the customer in some embodiments. The mobile wallet application maintains a balance synchronized with replicated ledgers in some embodiments that may be maintained on computing devices of the merchants 222, 224, 226, 228 and the point gateway 238. The operation of these various entities are described according to further with regard to some embodiments in FIG. 3 and FIG. 4, FIG. 3 is a block diagram of a method 300, according to an example embodiment. The method 300 is an example of a method that may be performed on a computing device participating in performing data processing activities of a purchase transaction. For example, the method 300 may be performed on a POS terminal device or within a cloud-based or other remotely performed transaction processing service.

The method 300 includes receiving 302, by a computing system of an entity, a unique account identifier within a transaction involving an account of the unique account identifier. The method 300 then calculates 304, on the computing system of the entity, a value based on the transaction for transfer to the account of the account identifier and generates 306 a data structure in memory to transfer the calculated value to the account of the account identifier. The method 300 further includes signing 308 the data structure in the memory with a private key of a private/public key-pair of the entity and transmitting 310 the data structure from the computing system of the entity to a computing system where a replicated trusted ledger used to maintain value balances is maintained.

In some such embodiments, the data structure transfers the calculated value from a value balance of the entity to a value balance of the account of the account identifier. Some such embodiments also include transmitting a message communicating the value transfer from the computing system of the entity to the account based on the account identifier.

The replicated trusted ledger, in some embodiments, is private to entities participating in providing and redeeming the value that is generated. In some other embodiments, the generated 306 and signed 308 data structure is a block of a blockchain and the ledger is a blockchain ledger of the blockchain. In some of these embodiments, the unique account identifier is a digital identifier (DID) of an account known within the blockchain.

In some embodiments of the method 300, the value is a non-currency amount and the entity is one of a plurality of participating entities that are joined in a singular value network where the non-currency amount of value may be redeemed with any entity of the singular value network without regard to which entity issued the points.

FIG. 4 is a block diagram of a method 400, according to an example embodiment. The method 400 is an example of a method that may be performed on a POS terminal, such as a teller assisted checkout terminal, a self-service checkout terminal, within processing of a tablet or other mobile device implemented for POS processing, in a cloud-based portion of a checkout process, and the like.

In some embodiments, the method 400 includes receiving 402 a unique account identifier as part of data received at a POS device of an entity for a purchase transaction and executing 404, such as by the POS device, the purchase transaction successfully. This may include receiving a currency payment in cash, check, bankcard, cryptocurrency, and the like. The method may then proceed by calculating 406 a point value for awarding to an account of the unique account identifier based on at least one factor of the successfully executed transaction. The factor may include a purchase value of the transaction, a fixed value per transaction or item within the transaction, a number of nights at a hotel or facility, a number of rental days, and the like included in the transaction. The account identifier may also have a certain loyalty status with the entity, some entities, or all entities participating in the value granting and redemption solutions herein. In such embodiments, the calculating 406 may include a multiple factor that is applied to increase the value to be awarded.

The method 400 then adds the calculated 406 value. The adding may include writing 408, by the POS device over a network to a replicated trusted ledger, data including the unique account identifier and the calculated 406 point value to award the calculated 406 point value to the account of the unique account identifier. The replicated trusted ledger is utilized in such embodiments to maintain account point values of customers for a plurality of entities. In such embodiments, the point values are redeemable with at least some of the plurality of entities without regard to which entity credited any or all of the point values.

In some embodiments of the method 400, writing 408 the data including the unique account identifier and the calculated 406 point value to the replicated trusted ledger includes generating, such as on the POS device, a data structure in memory to award the calculated point value to the account of the account identifier. The data structure is then signed, e.g., cryptographically signed, in the memory with a private key of a private/public key-pair of the entity. The writing 408 of the method 400 in such embodiments proceeds by transmitting, via the network, the data structure from the POS device to a plurality of computing systems where copies of the replicated trusted ledger are maintained. In some such embodiments, the data structure is written 408 to each copy of the replicated trusted ledger when there are no objections by the plurality of computing systems after receipt of the data structure.

In some embodiments of the method 400 the generated and signed data structure is a block of a blockchain and the replicated trusted ledger is a blockchain ledger of the blockchain. In such embodiments, the unique account identifier is a digital identifier (DID) of an account known within the blockchain.

In some other embodiments of the method 400, the replicated trusted ledger is private to entities participating in providing and redeeming the value that is generated.

In some embodiments of the method 400, the unique account identifier is received in a radio signal by a near field communication (NFC) device of the POS device, such as BLUETOOTH®. In other embodiments, the unique account identifier is received by scanning a QR code, barcode, or other visual indicia. In further embodiments, the unique identifier may be received via one or more human input devices such as a keypad (e.g., phone number, government or other entity issued identification number) or a biometric reading device.

Figure 5:
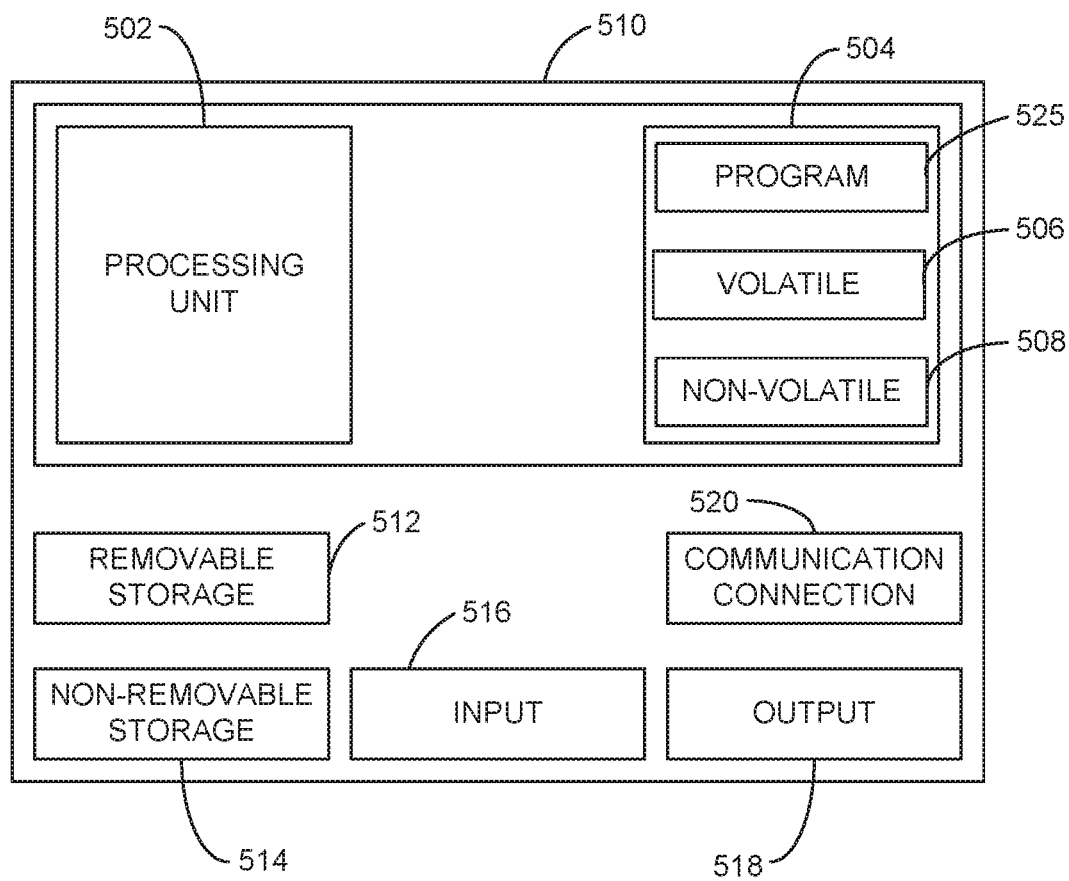
FIG. 5 is a block diagram of a computing device, according to an example embodiment.

FIG. 5 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 510, may include a processing unit 502, memory 504, removable storage 512, and non-removable storage 514. Although the example computing device is illustrated and described as computer 510, the computing device may be in different forms in different embodiments. For example, the computing device may instead be a smartphone, a tablet, smartwatch, or other computing device including the same or similar elements as illustrated and described with regard to FIG. 5. Devices such as smartphones, tablets, and smartwatches are generally collectively referred to as mobile devices. Further, although the various data storage elements are illustrated as part of the computer 510, the storage may also or alternatively include cloud-based storage accessible via a network, such as the Internet.

Returning to the computer 510, memory 504 may include volatile memory 506 and non-volatile memory 508. Computer 510 may include or have access to a computing environment that includes a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 510 may include or have access to a computing environment that includes input 516, output 518, and a communication connection 520. The input 516 may include one or more of a touchscreen, touchpad, mouse, keyboard, camera, one or more device-specific buttons, one or more sensors integrated within or coupled via wired or wireless data connections to the computer 510, and other input devices. The computer 510 may operate in a networked environment using a communication connection 520 to connect to one or more remote computers, such as database servers, web servers, and other computing device. An example remote computer may include a personal computer (PC), server, router, network PC, a peer device or other common network node, or the like. The communication connection 520 may be a network interface device such as one or both of an Ethernet card and a wireless card or circuit that may be connected to a network. The network may include one or more of a Local Area Network (LAN), a Wide Area. Network (WAN), the Internet, and other networks. In some embodiments, the communication connection 520 may also or alternatively include a transceiver device, such as a BLUETOOTH® device that enables the computer 510 to wirelessly receive data from and transmit data to other BLUETOOTH® devices. For example, the communication connection 520 in some embodiments may be a BLUETOOTH® connection with a wireless headset that includes a speaker and a microphone. As such in these embodiments, a BLUETOOTH® transceiver device may be the audio output device as described elsewhere herein.

Computer-readable instructions stored on a computer-readable medium are executable by the processing unit 502 of the computer 510. A hard drive (magnetic disk or solid state), CD-ROM, and RAM are some examples of articles including a non-transitory computer-readable medium. For example, various computer programs 525 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
receiving, at a point of sale (POS) device of an entity, a unique blockchain account identifier as part of data received for a purchase transaction with a consumer, wherein the unique blockchain account identifier is obtained via a near field communication (NFC) device integrated with the POS device and the NFC device is configured to receive the unique blockchain account identifier in a radio signal;
executing, by the POS device, the purchase transaction successfully;
calculating, by the POS device, a non-monetary point value for awarding to an account of the unique blockchain account identifier based on at least one factor of the successfully executed transaction and calculating a hash value for the non-monetary point value associated with the purchase transaction, wherein the non-monetary point value is determined using an algorithm that accounts for a combination of transaction factors including a monetary value of the transaction, a fixed point value per transaction or per item included in the transaction, and a loyalty status of the consumer with the entity;
writing, by the POS device over a network to a replicated trusted blockchain ledger, data including the unique blockchain account identifier, the calculated non-monetary point value to award the calculated non-monetary point value to the account of the unique blockchain account identifier, a pointer to a previous block, and the hash value, wherein the replicated trusted blockchain ledger maintaining account point values of customers for a plurality of entities, the point values redeemable at each of the plurality of entities without regard to which entity credited any or all of the point values, wherein the writing includes utilizing blockchain protocols adapted for blockchain data structures; and
securing access to the blockchain ledger and all replicated blockchain ledgers to entities participating in providing and redeeming value balances through private/public key pairs and restricting access to the blockchain ledger through key-based encryption based on the unique blockchain account identifier appearing in transaction data associated with other transactions of the consumer with the entity and the other entities and maintaining privacy of the blockchain ledger for entities participating in providing and redeeming value generated according to the method, and maintaining the blockchain ledger as the corresponding hash values of the corresponding blocks along with sequencing data of the corresponding blocks and detecting tampering with the corresponding blocks based on the sequencing data, wherein the replicated trusted blockchain ledgers include the sequencing data, wherein the blockchain ledger is maintained on a plurality of distributed nodes to ensure data integrity and redundancy.

2. The method of claim 1, wherein writing the data including the unique blockchain account identifier and the calculated non-monetary point value to the replicated trusted blockchain ledger includes:
  generating, on the POS device, a block data structure in memory to award the calculated non-monetary point value to the account of the unique blockchain account identifier;
  signing, on the POS device, the block data structure in the memory with a private key of a private/public key-pair of the entity;
  transmitting, via the network, the block data structure from the POS device to a plurality of computing systems where copies of the replicated trusted blockchain ledger are maintained; and
  wherein the block data structure is written to each copy of the replicated trusted blockchain ledger when there are no objections by the plurality of computing systems after receipt of the data structure.

3. The method of claim 2, wherein the blockchain data structure transfers the calculated non-monetary point value from a non-monetary point value balance of the entity to a non-monetary point value balance of the account of the unique blockchain account identifier.

4. The method of claim 2, further comprising:
  transmitting, from the POS device, a message communicating the point value award to the account of the unique blockchain account identifier using the unique blockchain account identifier as an address to which the message is transmitted.

5. The method of claim 2, wherein the unique blockchain account identifier is a digital identifier (DID) of an account known within the blockchain.

6. The method of claim 1, wherein the NFC device is a BLUETOOTH device.

7. A point of sale (POS) device comprising:
  a network interface device;
  a computer processor;
  a memory storing instructions executable by the computer processor to perform data processing activities comprising:
    receiving a unique blockchain account identifier as part of data received for a purchase transaction between an entity and a consumer, wherein the unique blockchain account identifier is obtained via a near field communication (NFC) device integrated with the POS device and the NFC device is configured to receive the unique blockchain account identifier in a radio signal;
    executing the purchase transaction successfully;
    calculating a non-monetary point value for awarding to an account of the unique blockchain account identifier based on at least one factor of the successfully executed transaction and calculating a hash value for the non-monetary point value associated with the purchase transaction, wherein the non-monetary point value is determined using an algorithm that accounts for a combination of transaction factors including a monetary value of the transaction, a fixed point value per transaction or per item included in the transaction, and a loyalty status of the consumer with the entity;
    writing, via the network interface device over a network to a replicated trusted blockchain ledger, data including the unique blockchain account identifier, the calculated non-monetary point value to award the calculated non-monetary point value to the account of the unique blockchain account identifier, a pointer to a previous block, and the hash value, wherein the replicated trusted blockchain ledger used to maintain account point values of customers for a plurality of entities, the point values redeemable at each of the plurality of entities without regard to which entity credited any or all of the point values, wherein the writing includes utilizing blockchain protocols adapted for blockchain data structures; and
    securing access to the blockchain ledger and all replicated blockchain ledgers to entities participating in providing and redeeming value balances through private/public key-pairs and restricting access to the blockchain ledger through key-based encryption based on the unique blockchain account identifier appearing in transaction data associated with other transactions of the consumer with the entity and the other entities and maintaining privacy of the blockchain ledger for entities participating in providing and redeeming generated value, and maintaining the blockchain ledger as the corresponding hash values of the corresponding blocks along with sequencing data of the corresponding blocks and detecting tampering with the corresponding blocks based on the sequencing data, wherein the replicated trusted blockchain ledgers include the sequencing data and wherein the blockchain ledger is maintained on a plurality of distributed nodes to ensure data integrity and redundancy.

8. The POS device of claim 7, wherein writing the data including the unique blockchain account identifier and the calculated non-monetary point value to the replicated trusted ledger includes:
  generating a block data structure in memory to award the calculated non-monetary point value to the account of the unique blockchain account identifier;
  signing the block data structure in the memory with a private key of a private/public key-pair of the entity;
  transmitting, via the network interface device over the network, the block data structure to a computing system where a copy of the replicated trusted blockchain ledger is maintained; and
  wherein the block data structure is written to each copy of the replicated trusted blockchain ledger when there are no objections by the plurality of computing systems after receipt of the data structure.

9. The POS device of claim 8, further comprising:
  transmitting a message via the network interface over the network communicating the point value award to the account of the unique blockchain account identifier using the unique blockchain account identifier as an address to which the message is transmitted.

* * * * *